United States Patent
Balastre et al.

(10) Patent No.: US 12,256,731 B2
(45) Date of Patent: Mar. 25, 2025

(54) AGRICULTURAL ADJUVANT COMPOSITIONS AND METHODS FOR USING SUCH COMPOSITIONS

(71) Applicant: SPECIALTY OPERATIONS FRANCE, Lyons (FR)

(72) Inventors: Marc Balastre, Singapore (SG); Florent Pinot, Colombes (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 0 days.

(21) Appl. No.: 15/749,659

(22) PCT Filed: Jul. 28, 2016

(86) PCT No.: PCT/EP2016/068025
§ 371 (c)(1),
(2) Date: Feb. 1, 2018

(87) PCT Pub. No.: WO2017/021271
PCT Pub. Date: Feb. 9, 2017

(65) Prior Publication Data
US 2018/0220645 A1    Aug. 9, 2018

(30) Foreign Application Priority Data
Aug. 4, 2015    (EP) .................................. 15179746

(51) Int. Cl.
| | | |
|---|---|---|
| *A01N 25/30* | (2006.01) | |
| *A01N 25/02* | (2006.01) | |
| *C05C 1/00* | (2006.01) | |
| *C05C 3/00* | (2006.01) | |
| *C05C 9/00* | (2006.01) | |
| *C05D 1/00* | (2006.01) | |
| *C05D 9/02* | (2006.01) | |
| *C05G 3/00* | (2020.01) | |
| *C05G 3/60* | (2020.01) | |
| *C05G 5/23* | (2020.01) | |

(52) U.S. Cl.
CPC ............. *A01N 25/30* (2013.01); *A01N 25/02* (2013.01); *C05C 1/00* (2013.01); *C05C 3/00* (2013.01); *C05C 3/005* (2013.01); *C05C 9/00* (2013.01); *C05D 1/00* (2013.01); *C05D 9/02* (2013.01); *C05G 3/60* (2020.02); *C05G 5/23* (2020.02)

(58) Field of Classification Search
None
See application file for complete search history.

(56) References Cited

U.S. PATENT DOCUMENTS

| | | |
|---|---|---|
| 6,589,913 B1 | 7/2003 | Killick et al. |
| 7,314,848 B1 | 1/2008 | Killick et al. |
| 10,334,843 B1 * | 7/2019 | Modaressi ............. A01N 57/20 |
| 2006/0264328 A1 * | 11/2006 | Modaressi ............. A01N 25/30 |
| | | 106/501.1 |
| 2012/0040833 A1 | 2/2012 | Kisenwether et al. |

* cited by examiner

*Primary Examiner* — Erin E Hirt
(74) *Attorney, Agent, or Firm* — Osha Bergman Watanabe & Burton LLP

(57) ABSTRACT

The present invention relates to an aqueous formulation comprising at least one plant nutrient, one fatty acid ($C_1$-$C_3$) alkyl ester, and a betaine surfactant, wherein the fatty acid ($C_1$-$C_3$) alkyl ester is present in an amount ranging from 0.5 to 16 pbw, for instance from 1 to 16 pbw, based on 100 pbw of the formulation, the betaine surfactant is present in an amount of at least 5 pbw, based on 100 pbw of the formulation, and the weight ratio between the betaine surfactant and the fatty acid ($C_1$-$C_3$) alkyl ester is greater than 0.9. It also relates to the use of such formulations as an agricultural adjuvant composition.

16 Claims, No Drawings

AGRICULTURAL ADJUVANT COMPOSITIONS AND METHODS FOR USING SUCH COMPOSITIONS

This application is a U.S. national phase entry under 35 U.S.C. § 371 of International Application No. PCT/EP2016/068025, filed Jul. 28, 2016, which claims priority to European application No. 15179746.1 filed on Aug. 4, 2015. The entire contents of these applications are being incorporated herein by reference.

The present invention relates to agricultural adjuvant compositions, pesticide compositions containing them and methods for using such compositions.

Many agricultural pesticides, including insecticides, fungicides, herbicides, miticides and plant growth regulators, are applied in the form of a liquid composition. In addition to the pesticide, such liquid compositions typically include one or more adjuvant compounds intended to improve one or more properties of the liquid composition, such as for example, storage stability, ease of handling and/or pesticide efficacy against target organisms.

An approach that has been found to be convenient in some cases is to provide an easily transportable concentrated pesticide composition that comprises a relatively high concentration of pesticide compound and adjuvant compounds that is heavily diluted at the point of use to provide a pesticide composition for application to target pests. However, in some cases, such as those in which the relatively high concentrations of pesticide and adjuvant compounds results in a concentrated pesticide composition that is non-homogeneous, unstable, and/or difficult to handle, for example, due to intractably high viscosity, this approach may not be feasible and/or convenient. Additionally, in some cases, concentrated pesticide formulations also require high amounts of adjuvants to be efficient.

In such cases, another approach is to provide tank mixes or alternatively to provide low concentrated pesticide compositions.

Tank mixes are combinations of agricultural products (pesticide formulation and tank mix adjuvant compositions) that a farmer would pour into a tank (in which the tank mix is prepared), with water and perhaps other additives, mix (optionally by stirring) and then apply on the field. These mixes are typically not stable for extended periods of time (though some of them may exhibit this benefit).

Commercial concentrated pesticide formulations differ from low concentrated pesticide compositions especially in that they are formulated in such a concentration that the product must necessarily be heavily diluted into water before application. On the contrary low concentrated pesticide compositions can be applied either undiluted (ready-to-use pesticide compositions) or after having been only slightly diluted beforehand. Generally speaking, for a given pesticide and a given target pest, a low concentrated pesticide composition needs to be diluted at least three times less, typically at least five time less, or even at least ten time less, than the counterpart concentrated pesticide formulation.

The criteria to choose between a concentrated pesticide composition or a low concentrated pesticide formulation may also depend on the market segment, the surface to be treated and/or the final user. For instance, farmers that decide to apply a pesticide treatment on a large field area would typically use concentrated pesticide compositions, whereas home gardeners taking care of comparatively smaller areas would preferably use low concentrated pesticide compositions, or even field ready pesticide formulations.

It is common practice to make use of plant nutrients, surfactants or oils, alone or in admixture with one another, as adjuvant compounds for tank mixes or as adjuvant compounds in low concentrated pesticide compositions, in order to improve the properties and/or the performances of a given final pesticide formulation.

For instance, it may be desirable to add ammonium sulfate as a high-nitrogen (21 wt % N) fertilizer material. Ammonium sulfate may also be a useful adjuvant compound to achieve water conditioning effects. As a matter of fact, ammonium sulfate is known to reduce the effect of the hard water ions (especially calcium and magnesium ions) on the efficacy of some pesticides such as weak acid herbicides (like glyphosate).

It is also widely known in the art that the application and action of an oil (such as fatty acid ($C_1$-$C_3$) alkyl esters) can be improved by combining it with surface-active substances such as betaine surfactants (which are also useful—independently—as biological activators).

U.S. Pat. No. 6,589,913 teaches liquid agrochemical compositions comprising organic acids, lipophilic solvents, plant nutrients and oil soluble bases, wherein said oil soluble bases form a lipophilic solvent soluble complex with the organic acid.

U.S. Pat. No. 7,314,848 teaches liquid adjuvants for use with an agrochemical active ingredient comprising lipophilic solvents, lipophobic plant nutrients and a mixture of one or more specific cationic emulsifiers, wherein said cationic emulsifiers act as a coupling agent between the lipophilic solvent and the lipophobic plant nutrient to form a homogeneous liquid composition.

These two documents disclose formulations containing high amounts (greater than 25 pbw) of lipophilic solvents and low amounts (lower than 3 pbw) of betaine. In these formulations, significant amounts (up to 10 pbw) of non ionic surfactant and/or of cationic surfactants are required to achieve stability.

US2012/040833 teaches pesticide concentrate compositions that contain a high load of pesticide and that exhibit good stability, low viscosity and improved ease of handling. These concentrate compositions, which are to be diluted with water typically in a ratio of from at least 1:10 (pbw pesticide concentrate composition: pbw water), contain up to 10 pbw of fatty acid (C1-C3) esters and up to 20 pbw of a betaine surfactant.

It is still a goal to develop better adjuvant formulations, in particular easier to use and/or cost-effective adjuvant formulations.

There is especially a continuing interest in adjuvant compositions for tank mixes and/or for low concentrated pesticide compositions that are able to combine simultaneously (i.e. in a single formulation) the benefits of more than one adjuvant compound and that are useful in particular to increase the uptake and/or biological efficacy of a pesticide.

In particular, there is still a need today for a single adjuvant formulation combining effective amounts of a plant nutrient, of a fatty acid ($C_1$-$C_3$) alkyl ester, and of a betaine surfactant, while maintaining satisfactory properties (such as stability, dispersability and ease of handling of the adjuvant formulation) and while imparting improved uptake and/or biological efficacy of a pesticide in the final pesticide formulation.

There is also a need to provide adjuvant formulations combining effective amounts of a plant nutrient, of a fatty acid ($C_1$-$C_3$) alkyl ester, and of a betaine surfactant and at the same time minimizing the required amount of surfactants different from the betaine surfactant, while maintaining satisfactory properties (such as stability, dispersability and ease of handling of the adjuvant formulation) and while imparting improved uptake and/or biological efficacy of a pesticide in the final pesticide formulation.

The invention addresses at least one of the needs above by providing an aqueous formulation comprising at least:
a) one plant nutrient,
b) one fatty acid ($C_1$-$C_3$) alkyl ester, and
c) a betaine surfactant,
wherein
the fatty acid ($C_1$-$C_3$) alkyl ester is present in an amount ranging from 0.5 to 16 pbw, for instance from 1 to 16 pbw, based on 100 pbw of the formulation,
the betaine surfactant is present in an amount of at least 5 pbw, based on 100 pbw of the formulation, and
the weight ratio between the betaine surfactant and the fatty acid ($C_1$-$C_3$) alkyl ester is greater than 0.9.

It has been found unexpectedly that such an aqueous formulation is homogeneous (single phase formulation) and stable for extended periods of time, while providing good formulation properties (such as good dispersability).

The relative proportions between the ingredients, notably the minimum amount in the betaine surfactant and weight ratio between the betaine surfactant and the fatty acid ($C_1$-$C_3$) alkyl ester, makes it possible advantageously to minimize the required amount of other surfactants in the formulation.

According to another aspect, the invention relates to the use of such a formulation as an agricultural adjuvant composition, for example as a tank-mix adjuvant or as an adjuvant for a low concentrated pesticide composition.

According to another aspect, the invention relates to a low concentrated pesticide composition comprising at least a formulation of the invention and a pesticide compound (typically an herbicide, for example selected from glyphosate, glufosinate, their respective water soluble salts and esters, and mixtures thereof) in an amount ranging from 0.05 to 14 pbw, based on 100 pbw of the low concentrated pesticide composition.

According to yet a further aspect, the invention relates to a method for preparing a tank mix, which comprises the step of contacting a pesticide formulation, water, and a tank mix adjuvant, wherein the tank mix adjuvant is a formulation of the invention.

Definitions

As used herein, the term "alkyl" means a saturated straight chain or branched chain hydrocarbon radical, such as for example, methyl, ethyl, n-propyl, iso-propyl, n-butyl, sec-butyl, t-butyl, pentyl, n-hexyl.

As used herein, the term "alkoxyl" means an oxy group substituted with an alkyl group, such as, for example, methoxyl, ethyoxyl, propoxyl.

As used herein, the term "hydroxyalkyl" means a saturated straight chain or branched chain hydrocarbon radical substituted one or more carbon atoms with a hydroxyl group, such as for example, hydroxymethy, hydroxyethyl, hydroxypropyl.

As used herein, the term "alkenyl" means an unsaturated straight chain, branched chain, or cyclic hydrocarbon radical that contains one or more carbon-carbon double bonds, such as, for example, ethenyl, 1-propenyl, and 2-propenyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as, for example, phenoxy, phenyl, methylphenyl, dimethylphenyl, trimethylphenyl, chlorophenyl, trichloromethylphenyl, aminophenyl, and tristyrylphenyl.

As used herein, the term "alkylamido" means amido radical, substituted with an alkyl group, such as dodecylamido, tetradecylamido.

As used herein, the term "alkylamidoalkyl" means an alkyl group substituted with an alkylamido group, such as dodecylamidoalkyl, tetradecylamidoalkyl.

As used herein, the terminology "($C_m$-$C_n$)" in reference to an organic group, wherein m and n are each integers, indicates that the group may contain from m carbon atoms to n carbon atoms per group.

As used herein, the term "aqueous" in reference to a composition means that the composition comprises greater than 0 pbw water per 100 pbw of the composition.

As referred to herein, the "weight" a given material is typically given on the basis of the named material. For example, a reference to 25 parts by weight of a given surfactant, wherein the surfactant compound is provided as a 50% by weight aqueous solution of the surfactant compound, would typically mean 25 parts by weight of the surfactant compound itself, which would correspond to 50 parts by weight of the 50 wt % aqueous solution of the surfactant compound.

Should the disclosure of any patents, patent applications, and publications which are incorporated herein by reference conflict with the description of the present application to the extent that it may render a term unclear, the present description shall take precedence.

Plant Nutrients

The aqueous formulation of the invention comprises at least one plant nutrient.

In one embodiment, the plant nutrient is a fertilizer.

Fertilizers can provide the primary nutrients of nitrogen, phosphorus and/or potassium and/or secondary nutrients sulfur, calcium, magnesium and/or sodium.

Suitable fertilizers include fertilizers providing nitrogen (such as urea, ammonium nitrate, ammonium sulfate, ammonium sulfate nitrate, ammonium phosphate, di-ammonium phosphate), fertilizers providing phosphorus (such as ammonium phosphate and di-ammonium phosphate) and fertilizers providing potassium (such as potassium chloride).

Fertilizers providing sulfur, such as ammonium thiosulfate, and fertilizers providing sodium, such as sodium carbonate, are also suitable.

Suitable fertilizers also include micronutrient fertilizers containing zinc, iron, molybdenum, copper, boron, chlorine, magnesium and mixtures thereof.

The plant nutrient is preferably a fertilizer providing the primary nutrients of nitrogen, phosphorus and/or potassium.

In one embodiment, the plant nutrient is selected in the group consisting of ammonium sulfate, urea, ammonium nitrate, micronutrient fertilizers and mixture thereof.

In another embodiment, the plant nutrient is selected in the group consisting of ammonium sulfate, urea, ammonium nitrate, and mixture thereof. In this case, the aqueous formulation of the invention may further include micronutrient fertilizers.

More generally, micronutrient fertilizers may be used either as sole plant nutrient, or as an additional plant nutrient to be used in combination with a separate plant nutrient, such as those listed above including, but not limited to, ammonium sulfate, urea and mixture thereof.

In another embodiment, the plant nutrient is ammonium sulfate. Such plant nutrients have proven to be also efficient to minimise the deleterious effects of hard water on weak acid herbicide (like glyphosate) performance.

In one embodiment, the formulation of the present invention comprises, based on 100 pbw of the formulation, at least 0.5 pbw of one or more plant nutrient, for instance at least about 1 pbw, for instance from about 4 pbw to about 35 pwb of one or more plant nutrient, more typically from about 5 pbw to about 30 pbw, and even more typically from about 10 pbw to about 25 pbw.

In one embodiment, the formulation of the invention comprises more than 10 pbw of one or more plant nutrient, based on 100 pbw of the formulation.

Fatty Acid ($C_1$-$C_3$) Alkyl Ester Component

The aqueous formulation of the invention comprises at least one fatty acid ($C_1$-$C_3$)alkyl ester, in an amount ranging from 0.5 to 16 pbw, for instance from 1 to 16 pbw, based on 100 pbw of the formulation.

In one embodiment, the fatty acid ($C_1$-$C_3$)alkyl ester of the formulation of the present invention comprises one or more compounds according to structure (I).

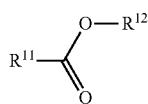

(I)

wherein:
$R^{11}$ is ($C_6$-$C_{24}$)alkyl or ($C_6$-$C_{24}$)alkenyl, and
$R^{12}$ is ($C_1$-$C_3$)alkyl, more typically, methyl.

In one embodiment, the fatty acid ($C_1$-$C_3$)alkyl ester comprises one or more compounds according to structure (I) wherein $R^{11}$ is ($C_6$-$C_{24}$)alkyl, such as, for example, hexyl, heptyl, octyl, nonyl, decyl, undecyl, dodecyl, tridecyl, tetradecyl, pentadecyl, hexadecyl, heptadecyl, octadecyl, nonadecyl, eicosyl, docosyl, tricosyl, tetracosyl.

In one embodiment, the fatty acid ($C_1$-$C_3$)alkyl ester comprises one or more compounds according to structure (I) wherein $R^{11}$ is mono-unsaturated or poly-unsaturated ($C_6$-$C_{24}$)alkenyl, such as, for example, cis-9-hexadecenyl all cis-7,10,13-hexadecatrienyl, cis-6-octadecenyl, trans-6-octadecenyl, cis-7-octadecenyl, cis-9-octadecenyl, trans-9-octadecenyl, cis-11-octadecenyl trans-11-octadecenyl, cis-12-octadecenyl, cis, cis-9,12-octadecedienyl, trans-9,12-octadecedienyl, all cis-6,9,12-octadecatrienyl, all cis-9,12,15-octadecatrienyl, all cis-6,9,12,15,-octadecatetraenyl, cis-11-eicosenyl, cis, cis-11,14-eicosadienyl, all cis-11,14,17-eicosatrienyl all cis-5,8,11,14-eicosatetraenyl, all cis-8,11,14,17-eicosatetraenyl, all cis-5,8,11,14,17-eicosapentaenyl, cis-13-docosenyl, cis, cis-13,16-docosadienyl, all cis-6,9,12-octadecatrienyl, all cis-7,10,13,16-docosatetraenyl, all cis-7,10,13,16,19-docosapentaenyl, all cis-4,7,10,13,16,19-docosahexaenyl, cis-15-tetracosenyl, all cis-9,12,15,18,21-tetracosapentaenyl, or all cis-6,9,12,15,18,21-tetracosahexaenyl.

In one embodiment, the fatty acid ($C_1$-$C_3$)alkyl ester comprises one or more compounds according to structure (I) wherein $R^{11}$ is ($C_6$-$C_{24}$)alkyl and one or more compounds according to structure (I) wherein $R^{11}$ is mono-unsaturated or poly-unsaturated ($C_6$-$C_{24}$)alkenyl.

In one embodiment, the fatty acid ($C_1$-$C_3$)alkyl ester comprises one or more compounds according to structure (I) wherein $R^{11}$ is ($C_6$-$C_{24}$)alkyl and one or more compounds according to structure (I) wherein $R^{11}$ is mono-unsaturated or poly-unsaturated ($C_6$-$C_{24}$)alkenyl, and $R^{12}$ is methyl.

In one embodiment, the fatty acid ($C_1$-$C_3$)alkyl ester comprises one or more compounds according to structure (I) wherein $R^{11}$ is ($C_6$-$C_{12}$)alkyl or ($C_6$-$C_{12}$)alkenyl. In another embodiment, the fatty acid ester comprises one or more compounds according to structure (I) wherein $R^{11}$ is ($C_{13}$-$C_{24}$)alkyl or ($C_{13}$-$C_{24}$)alkenyl.

In one embodiment, the fatty acid ($C_1$-$C_3$)alkyl ester comprises one or more compounds according to structure (I) wherein $R^{11}$ is ($C_6$-$C_{12}$)alkyl or ($C_6$-$C_{12}$)alkenyl, and $R^{12}$ is methyl. In another embodiment, the fatty acid ester comprises one or more compounds according to structure (I) wherein $R^{11}$ is ($C_{13}$-$C_{24}$)alkyl or ($C_{13}$-$C_{24}$)alkenyl, and $R^{12}$ is methyl.

Suitable fatty acid ($C_1$-$C_3$)alkyl esters may be made by, for example, acid-catalyzed esterification of corresponding fatty acids or corresponding fatty mono-, di- and/or tri-glycerides with a ($C_1$-$C_3$) alcohol, more typically methanol, or by transesterification of the corresponding fatty mono-, di- and/or tri-glycerides with a ($C_1$-$C_3$) alcohol, more typically methanol. Convenient sources of fatty acids and fatty acid glycerides include vegetable oils, such as, for example, palm oil, soybean oil, rapeseed oil, high erucic acid rapeseed oil, sunflower seed oil, peanut oil, cottonseed oil, palm kernel oil, linseed oil, coconut oil, olive oil, safflower oil, sesame oil, canola oil and animals fats, such as tallow, lard oil or fish oil, as well as mixtures of such compounds. Suitable fatty acid methyl esters are commercially available. One commercial source of fatty acid ($C_1$-$C_3$)alkyl esters is "bio-diesel" fuels made by transesterification of vegetable oils or animal fats with a ($C_1$-$C_3$) alcohol, more typically methanol.

In one embodiment, the fatty acid ($C_1$-$C_3$)alkyl ester component of the formulation of the present invention comprises one or more of methyl, ethyl, or propyl hexanoate, methyl, ethyl, or propyl heptanoate, methyl, ethyl, or propyl octanoate, methyl, ethyl, or propyl nonanoate, methyl, ethyl, or propyl decanoate, methyl, ethyl, or propyl undecanoate, methyl, ethyl, or propyl dodecanoate, methyl, ethyl, or propyl tridecanoate, methyl, ethyl, or propyl tetradecanoate, methyl, ethyl, or propyl pentadecanoate, methyl, ethyl, or propyl hexadecanoate, methyl, ethyl, or propyl heptadecanoate, methyl, ethyl, or propyl octadecanoate, methyl, ethyl, or propyl nonadecanoate, methyl, ethyl, or propyl eicosanoate, methyl, ethyl, or propyl docosanoate, methyl, ethyl, or propyl tricosanoate, methyl, ethyl, or propyl tetracosanoate, methyl, ethyl, or propyl cis-9-hexadecenoate, methyl, ethyl, or propyl all cis-7,10,13-hexadecatrienoate methyl, ethyl, or propyl cis-6-octadecenoate, methyl, ethyl, or propyl trans-6-octadecenoate, methyl, ethyl, or propyl cis-7-octadecenoate, methyl, ethyl, or propyl cis-9-octadecenoate, methyl, ethyl, or propyl trans-9-octadecenoate, methyl, ethyl, or propyl cis-11-octadecenoate, methyl, ethyl, or propyl trans-11-octadecenoate, methyl, ethyl, or propyl cis-12-octadecenoate, methyl, ethyl, or propyl cis, cis-9,12-octadecedienoate, methyl, ethyl, or propyl trans-9,12-octadecedienoate, methyl, ethyl, or propyl all cis-6,9,12-octadecatrienoate, methyl, ethyl, or propyl ester all cis-9,12,15-octadecatrienoate, methyl, ethyl, or propyl all cis-6,9,12,15,-octadecatetraenoate, methyl, ethyl, or propyl cis-11-eicosenoate, methyl, ethyl, or propyl cis, cis-11,14-eicosadienoate, methyl, ethyl, or propyl all cis-11,14,17-eicosatrienoate, methyl, ethyl, or propyl all cis-5,8,11,14- eicosatetraenoate, methyl, ethyl, or propyl all cis-8,11,14, 17-eicosatetraenoate, methyl, ethyl, or propyl all cis-5,8,11, 14,17-eicosapentaenoate, methyl, ethyl, or propyl cis-13-docosenoate, methyl, ethyl, or propyl cis, cis-13,16-docosadienoate, methyl, ethyl, or propyl all cis-6,9,12-octadecatrienoate, methyl, ethyl, or propyl all cis-7,10,13, 16-docosatetraenoate, methyl, ethyl, or propyl all cis-7,10, 13,16,19-docosapentaenoate, methyl, ethyl, or propyl all cis-4,7,10,13,16,19-docosahexaenoate, methyl, ethyl, or propyl cis-15-tetracosenoate methyl, ethyl, or propyl all cis-9,12,15,18,21-tetracosapentaenoate, methyl, ethyl, or propyl all cis-6,9,12,15,18,21-tetracosahexaenoate, including mixtures two or more of any of such fatty acid ($C_1$-$C_3$) alkyl esters. More typically, the fatty acid ester component of the formulation of the present invention comprises a mixture of two or more of such fatty acid ($C_1$-$C_3$)alkyl esters, in the form of one or more ($C_1$-$C_3$)alkyl esters of one or more vegetable oils, more typically, a methylated vegetable oil, even more typically, methylated soybean oil or methylated rapeseed oil.

In one embodiment, the formulation of the present invention comprises, based on 100 pbw of the formulation, from about 0.5 pbw to about 15 pwb of the fatty acid ($C_1$-$C_3$)alkyl ester, more typically from about 1 pbw to about 15 pbw, even more typically from about 2 pbw to about 15 pbw, for instance from 3 pbw to 15 pbw, or even from 4 pbw to 15 pbw.

In one embodiment, the formulation of the invention comprises less than 14 pbw of the fatty acid ($C_1$-$C_3$)alkyl ester, based on 100 pbw of the formulation, more typically less than 13 pbw.

Betaine Surfactant

The aqueous formulation of the invention comprises at least one betaine surfactant, in an amount of at least 5 pbw, based on 100 pbw of the formulation.

Betaine surfactants suitable as the betaine surfactant component of the formulation of the present invention are known compounds and include, for example, N-alkyl derivatives of glycine and N-alkyl derivatives of β-alanine, more typically N-alkyl derivatives of dimethyl glycine. In one embodiment, the betaine surfactant component of the formulation of the invention comprises one or more compounds according to structure (II):

(II)

wherein:
$R^{21}$ and $R^{22}$ are each independently alkyl, alkenyl, alkoxyalkyl, hydroxyalkyl, hydroxy-terminated poly(oxyalkylene), or alkoxy-terminated poly(oxyalkylene),
$R^{23}$ is a hydrophobic moiety, and
$R^{24}$ is methylene or dimethylene.

In one embodiment, $R^{21}$ and $R^{22}$ are each independently ($C_1$-$C_6$)alkyl, ($C_1$-$C_6$)alkenyl, an alkoxyalkyl group having from 2 to 6 carbon atoms per group, hydroxy($C_1$-$C_6$)alkyl, or $R^{25}$—$(OC_xH_{2x})_y$—, wherein $R^{25}$ is H or ($C_1$-$C_6$)alkyl, x is, independently for each —$(OC_xH_{2x})$— unit, 2 or 3, and y is an integer of from 1 to 20, more typically from 1 to 10.

In one embodiment, at least one of $R^{21}$ and $R^{22}$ is $R^{25}$—$(OC_xH_{2x})_y$— that contains —$(OC_xH_{2x})$— units in which x is 2, that is, oxyethylene units, and —$(OC_xH_{2x})$— units in which x is 3, that is, oxypropylene units, wherein the oxyethylene units and oxypropylene units are arranged in random order or in blocks.

In one embodiment:
$R^{21}$ and $R^{22}$ are each independently ($C_1$-$C_3$)alkyl,
$R^{23}$ is ($C_6$-$C_{30}$)alkyl, alkoxyalkyl having from 6 to 30 carbon atoms per group, ($C_6$-$C_{24}$)alkylamido($C_1$-$C_6$) alkyl, or ($C_6$-$C_{24}$)alkenylamido($C_1$-$C_6$)alkyl, and
$R^{24}$ is methylene or dimethylene.

In one embodiment, $R^{21}$ and $R^{22}$ are each independently ($C_1$-$C_6$)alkyl, more typically methyl, $R^{23}$ is ($C_6$-$C_{30}$)alkyl, more typically ($C_8$-$C_{22}$)alkyl, more typically ($C_8$-$C_{18}$)alkyl, and still more typically, ($C_{12}$-$C_{14}$)alkyl, and $R^{24}$ is methylene.

In one embodiment $R^{21}$ and $R^{22}$ are each independently ($C_1$-$C_6$)alkyl, more typically methyl, $R^{23}$ is alkylamidoalkyl, more typically ($C_6$-$C_{24}$)alkylamido($C_1$-$C_6$)alkyl, and, even more typically, ($C_8$-$C_{20}$)alkylamidopropyl, and $R^{24}$ is methylene.

Suitable betaines surfactants include, for example, decyl dimethyl betaine, undecyl dimethyl betaine, dodecyl dimethyl betaine, tridecyl dimethyl betaine, tetradecyl dimethyl betaine, coco dimethyl betaine, ($C_{12}$-$C_{14}$)alkyl dimethyl betaine, hexadecyl dimethyl betaine, heptadecyl dimethyl betaine, octadecyl dimethyl betaine, dodecylamidopropyl dimethyl betaine, cocoamidopropyl dimethyl betaine, oleylamidopropyl betaine, lauryl dihydroxypropylglycinate, lauryl di(hydroxy-poly(ethoxy))glycinate, β-alanine, cocodimethylbetaine, and mixtures thereof.

In one embodiment, the formulation of the present invention comprises, based on 100 pbw of the formulation, from about 5 pbw to about 40 pwb of the betaine surfactant, more typically from about 8 pbw to about 30 pbw, and even more typically from about 10 pbw to about 25 pbw.

Also according to the invention the weight ratio between the betaine surfactant and the fatty acid ($C_1$-$C_3$) alkyl ester must be greater than 0.9.

In one embodiment, the weight ratio between the betaine surfactant and the fatty acid ($C_1$-$C_3$) alkyl ester is greater than or equal to 1.0, more typically greater than or equal to 1.1.

Additional Surfactants Different From the Betaine Surfactant

The formulation of the invention may comprise at least one surfactant different from the betaine surfactant.

In one embodiment, the aqueous formulation of the invention further comprises at least one co-surfactant, intended to increase the solubilizing power of the betaine surfactant.

Suitable co-surfactant include, for example, alcohols, ether-alcohols or carboxylic acids.

In one embodiment, the co-surfactant is selected from the group consisting of straight-chain or branched aliphatic alcohols having from 3 to 10 carbon atoms, cycloaliphatic alcohols having from 5 to 12 carbon atoms, aryl aliphatic alcohols having from 7 to 12 carbon atoms, ether-alcohols of formula R—$(OR')_n$—OH, wherein R represents a straight-chain or branched alkyl radical having from 1 to 8 carbon atoms; R' represents an alkylene radical; and n represents an integer from 1 to 3; and straight-chain or branched aliphatic carboxylic acids having from 5 to 10 carbon atoms.

Typical co-surfactant includes alcohols selected in the group consisting of propan-1-ol, propan-2-ol, butan-1-ol, butan-2-ol, pentane-1-ol, pentane-2-ol, and pentan-3-ol.

In one embodiment, the formulation of the present invention comprises, based on 100 pbw of the formulation, from about 0.5 pbw to about 10 pbw of the co-surfactant.

In one examplary embodiment, the formulation of the present invention comprises, based on 100 pbw of the formulation, from about 0.5 pbw to about 5 pwb of the co-surfactant, more typically from about 1 pbw to about 4.5 pbw.

Such concentration ranges typically apply when the plant nutrient is chosen among sodium carbonate, potassium chloride or ammonium sulfate, for instance.

In another examplary embodiment, the formulation of the present invention comprises, based on 100 pbw of the formulation, from about 5 pbw to about 10 pwb of the co-surfactant, more typically from about 5.5 pbw to about 9.5 pbw.

Such concentration ranges typically apply when the plant nutrient is chosen among urea or ammonium nitrate, for instance.

In another embodiment, the weight ratio between the betaine surfactant and the co-surfactant in a formulation of the invention is greater than 1, more typically greater than 2, and even more typically greater than 3.

A formulation of the present invention preferably does not comprise any other surfactants, in addition to the betaine surfactant and to the optional co-surfactant as described previously.

In one embodiment, a formulation of the present invention contains from 0 to about 10 pbw, more typically from 0 to about 5 pbw, and even more typically from 0 to less than about 1 pbw of one or more glycoside surfactants.

In one embodiment, a formulation of the present invention contains from 0 to about 10 pbw, more typically from 0 to about 5 pbw, and even more typically from 0 to less than about 1 pbw of one or more amine oxide surfactants.

In one embodiment, a formulation of the present invention contains from 0 to about 10 pbw, more typically from 0 to about 5 pbw, and even more typically from 0 to less than about 1 pbw of one or more fatty (ether) amine alkoxylate surfactants.

In one embodiment, a formulation of the present invention contains from 0 to about 10 pbw, for instance from 0 to about 8 pbw, for instance from 0 to about 6 pbw, more typically from 0 to about 5 pbw, and even more typically from 0 to less than about 1 pbw of one or more amphoteric, or zwitterionic surfactant other than the betaine surfactant.

In one embodiment, a formulation of the present invention contains substantially no surfactant other than the betaine surfactant and the optional co-surfactant.

In one embodiment the weight ratio between the betaine surfactant and all the surfactants different from the betaine surfactant (including the optional co-surfactant) in a formulation of the invention is greater than 1, typically greater than 2, more typically greater than 3 and even more typically greater than 5.

According to an advantageous feature of the present invention, the betaine surfactant may act as main (or even the sole) surfactant in a formulation of the invention.

In one embodiment, the formulation of the invention is a tank mix adjuvant.

When the formulation of the invention is a tank mix adjuvant, it is typically essentially free of pesticides. This means that a tank mix adjuvant of the invention usually contains less than 0.05 pbw of a pesticide, based on 100 pbw of the tank mix adjuvant.

The tank mix adjuvant of the present invention exhibits good stability and handling properties, including low viscosity, and can be readily mixed with a pesticide and with water to form efficacious tank mix compositions that may be spray applied to target pests and/or the environment of the target pests.

In another embodiment, the formulation of the invention is a low concentrated pesticide composition.

When the formulation of the invention is a low concentrated pesticide composition, it typically contains, based on 100 pbw of the low concentrated pesticide composition, from about 0.05 pbw, more typically from about 1 pbw, and even more typically from about 2 pbw, to about 14 pbw, more typically to about 12 pbw, and even more typically to about 10 pbw, of the one or more pesticide compounds.

The low concentrated pesticide compositions of the present invention exhibits good stability and handling properties, including low viscosity, and forms efficacious aqueous pesticide compositions that can be spray applied (either undiluted or after having been only slightly diluted beforehand) to target pests and/or the environment of the target pests.

As mentioned previously, a low concentrated pesticide composition of the invention differs from a "pesticide concentrate composition". As a matter of fact, pesticide concentrate compositions generally contain a relatively high concentration of pesticide (typically of at least 20 pbw, based on 100 pbw of the concentrate composition for glyphosate concentrate compositions) and are intended to be heavily diluted with water before use to form a pesticide spray mix composition. On the contrary low concentrated pesticide compositions of the invention can be applied either undiluted (ready-to-use pesticide compositions) or after having been only slightly diluted beforehand (the dilution rate depending on the pesticide and particular indications which are known by the skilled person in the art).

Low concentrated pesticide compositions of the invention are typically useful for home gardening or as field ready pesticide formulations.

Suitable pesticides are biologically active compounds used to control agricultural pests and include, for example, herbicides, plant growth regulators, crop dessicants, fungicides, bacteriocides, bacteriostats, insecticides, and insect repellants, as well as their water soluble salts and esters. Suitable pesticides include, for example, triazine herbicides such as metribuzin, hexaxinone, or atrazine; sulfonylurea herbicides such as chlorsulfuron, mesosulfuron-methyl, iodosulfuron-methyl sodium, pyroxsulame; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; phenoxyacetic acids such as 2,4-D; diphenyl ether herbicides such as fluazifop, acifluorfen, bifenox, or oxyfluorfen; dinitro aniline herbicides such as trifluralin; organophosphonate herbicides such as glufosinate salts and esters and glyphosate salts and esters; dihalobenzonitrile herbicides such as bromoxynil, or ioxynil, benzoic acid herbicides such as dicamba, dipyridilium herbicides such as paraquat. Suitable fungicides include, for example, nitrilo oxime fungicides such as cymoxanil; imidazole fungicides such as benomyl, carbendazim, or thiophanate-methyl; triazole fungicides such as triadimefon; sulfenamide fungicides, such as captan; dithio-carbamate fungicides such as maneb, mancozeb, or thiram; chlorinated aromatic fungicides such as chloroneb; dichloro aniline fungicides such as iprodione, strobilurin fungicides such as kresoxim-methyl, trifloxystrobin or azoxystrobin; chlorothalonil; copper salt fungicides such as copper oxychloride; sulfur; phenylamides; and acylamino fungicides such as metalaxyl or mefenoxam. It has also been demonstrated that sodium bicarbonate exhibits fungicidal properties. It may therefore also be used as a fungicide. Suitable insecticides, include, for example, carbamate insecticides, such as methomyl, carbaryl, carbofuran, or aldicarb; organo thiophosphate insecticides such as EPN, isofenphos, isoxathion, chlorpyrifos, or chlormephos; organophosphate insecticides such as terbufos, monocrotophos, or terachlorvinphos; perchlorinated organic insecticides such as methoxychlor; synthetic pyrethroid insecticides such as fenvalerate, abamectin or emamectin benzoate, neonicotinoide insecticides such as thiamethoxam or imidacloprid; pyrethroid insecticides such as lambda-cyhalothrin, cypermethrin or bifenthrin, and oxadiazine insecticides such as indoxacarb, imidachlopryd, or fipronil. Suitable miticides include, for example, propynyl sulfite miticides such as propargite; triazapentadiene miticides such as amitraz; chlorinated aromatic miticides such as chlorobenzilate, or tetradifan; and dinitrophenol miticides such as binapacryl. Suitable nematicides include carbamate nematicides, such as oxamyl.

Pesticide compounds are, in general, referred herein to by the names assigned by the International Organization for Standardization (ISO). ISO common names may be cross-referenced to International Union of Pure and Applied Chemistry ("IUPAC") and Chemical Abstracts Service ("CAS") names through a number of sources.

In one embodiment, the pesticide (to be mixed with a tank mix adjuvant of the invention or already present in a low concentrated pesticide composition of the invention) comprises one or more compounds selected from herbicides, plant growth regulators, crop dessicants, fungicides, bacteriocides, bacteriostats, insecticides, miticides, nematocides, insect repellants, and mixtures thereof.

In one embodiment, the pesticide is an herbicide, for example selected from glyphosate, glufosinate, their respective water soluble salts and esters, and mixtures thereof.

In one embodiment, the final tank mix formulation or the low concentrated pesticide composition of the invention comprises one or more herbicide compounds selected from glyphosate, water soluble glyphosate salts, water soluble glyphosate esters, and mixtures thereof, more typically selected from the sodium salt of glyphosate, the potassium salt of glyphosate, the ammonium salt of glyphosate, the dimethylamine salt of glyphosate, the isopropyl amine salt of glyphosate, the trimesyl salt of glyphosate, and mixtures thereof.

In another embodiment, the pesticide is a fungicide. The final tank mix formulation or the low concentrated pesticide composition of the invention may for instance comprise one or more fungicide, such as for instance sodium bicarbonate.

Further Ingredients

A formulation of the invention may include further ingredients, such as anti-foaming agents (e.g. organopolysiloxanes anti-foaming agents), deposition control agents (e.g. anti-rebound or anti-drift agents), thickening agents (e.g. xanthan gum type polysaccharides, alginates, carboxylated or hydroxylated methylcelluloses, synthetic macromolecules of the polyacrylate, polymaleate, polyvinylpyrrolidone, polyethylene glycol or polyvinyl alcohol type, or of the inorganic type such as silica or bentonites . . . ), auxiliary additives (e.g.

antioxydants, anti-UV agents, pH adjusting agents, . . . ), or solvents (e.g. alcohols, such as glycol or glycerol . . . ).

In one embodiment, the final pesticide composition (either the tank mix composition obtained after mixing a tank mix adjuvant of the invention with a pesticide, or a low concentrated pesticide composition of the invention) is effective to control one or more target plant species of one or more of the following genera: Abutilon, Amaranthus, Artemisia, Asclepias, Avena, Axonopus, Borreria, Brachiaria, Brassica, Bromus, Chenopodium, Cirsium, Commelina, Convolvulus, Cynodon, Cyperus, Digitaria, Echinochloa, Eleusine, Elymus, Equisetum, Erodium, Helianthus, Imperata, Ipomoea, Kochia, Lolium, Malva, Oryza, Ottochloa, Panicum, Paspalum, Phalaris, Phragmites, Polygonum, Portulaca, Pteridium, Pueraria, Rubus, Salsola, Setaria, Sida, Sinapis, Sorghum, Triticum, Typha, Ulex, Xanthium and Zea, including annual broadleaf species such as, for example, velvetleaf (Abutilon theophrasti), pigweed (Amaranthus spp.), buttonweed (Borreria spp.), oilseed rape, canola, indian mustard, etc. (Brassica spp.), commelina (Commelina spp.), filaree (Erodium spp.), sunflower (Helianthus spp.), morningglory (Ipomoea spp.), kochia (Kochia scoparia), mallow (Malva spp.), wild buckwheat, smartweed, etc. (Polygonum spp.), purslane (Portulaca spp.), russian thistle (Salsola spp.), sida (Sida spp.), wild mustard (Sinapis arvensis) and cocklebur (Xanthium spp.), annual narrowleaf species such as for example, wild oat (Avena fatua), carpetgrass (Axonopus spp.), downy brome (Bromus tectorum), crabgrass (Digitaria spp.), barnyardgrass (Echinochloa crus-galli), goosegrass (Eleusine indica), annual ryegrass (Lolium multiflorum), rice (Oryza sativa), ottochloa (Ottochloa nodosa), bahiagrass (Paspalum notatum), canarygrass (Phalaris spp.), foxtail (Setaria spp.), wheat (Triticum aestivum) and corn (Zea mays), perennial broadleaf species such as, for example, mugwort (Artemisia spp.), milkweed (Asclepias spp.), canada thistle (Cirsium arvense), field bindweed (Convolvulus arvensis) and kudzu (Pueraria spp.), perennial narrowleaf species such as for example, brachiaria (Brachiaria spp.), bermudagrass (Cynodon dactylon), yellow nutsedge (Cyperus esculentus), purple nutsedge (C. rotundus), quackgrass (Elymus repens), lalang (Imperata cylindrica), perennial ryegrass (Lolium perenne), guineagrass (Panicum maximum), dallisgrass (Paspalum dilatatum), reed (Phragmites spp.), johnsongrass (Sorghum halepense) and cattail (Typha spp.), and other perennial species such as, for example, horsetail (Equisetum spp.), bracken (Pteridium aquilinum), blackberry (Rubus spp.), Raygrass and gorse (Ulex europaeus).

In one embodiment, the aqueous formulation of the invention comprises at least:
one plant nutrient selected in the group consisting of ammonium sulfate, urea, micronutrient fertilizers and mixture thereof, typically ammonium sulfate, in an amount of at least 4 pbw based on 100 pbw of the formulation,
one fatty acid ($C_1$-$C_3$) alkyl ester in the form of one or more ($C_1$-$C_3$)alkyl esters of one or more vegetable oils, more typically, a methylated vegetable oil, even more typically, methylated soybean oil or methylated rapeseed oil, in an amount ranging from about 1 pbw to about 15 pbw based on 100 pbw of the formulation, and
a betaine surfactant comprising one or more compounds according to structure (II) with $R^{21}$ and $R^{22}$ being each independently ($C_1$-$C_6$)alkyl, more typically methyl, $R^{23}$ being ($C_6$-$C_{30}$)alkyl, more typically ($C_8$-$C_{22}$)alkyl, more typically ($C_8$-$C_{18}$)alkyl, and still more typically, ($C_{12}$-$C_{14}$)alkyl, and $R^{24}$ being methylene, said betaine surfactant being present in an amount of at least 5 pbw, based on 100 pbw of the formulation, and the weight ratio between the betaine surfactant and the fatty acid ($C_1$-$C_3$) alkyl ester being greater than 0.9, typically greater than 1.

In one embodiment, a formulation of the present invention exhibits a viscosity at 25° C. and at 20 rpm of less than or equal to about 5,000 centiPoise ("cP"), more typically of less than or equal to 2,000 cP, for example from about 10 to about 400 cP, especially from about 10 to about 300 cP, and even more typically from about 10 to about 250 cP.

In one embodiment, a formulation of the present invention is substantially homogeneous in visual appearance. In one embodiment, a formulation of the present invention is in the form of a single liquid phase that is homogeneous, clear, and transparent in visual appearance.

It is common knowledge that the addition of optional suspending agents may however adversely impact clarity and transparency of such formulations.

A formulation of the present invention exhibits good storage stability. The criteria for assessing storage stability are that the formulation remains substantially homogeneous in visual appearance during storage and does not separate into layers of mutually insoluble liquid phases and does not form any solid precipitate upon quiescent standing In one embodiment, the formulation remains stable during storage at temperatures from −5° C. to 54° C. for greater than or equal to 7 days, more typically for greater than or equal to 14 days and even more typically for greater than or equal to 30 days (adaptation of CIPAC test MT46).

A formulation of the invention also exhibits good dilution stability and provides a suitable dispersion.

The term "suitable dispersion" is intended to denote a dispersion after dilution in water (CIPAC standard waters A or D) which is homogeneous (i.e. which exhibits substantially no phase separation (sedimentation, creaming, etc)) over time, in particular which remains substantially homogeneous when it is stored for 30 minutes in a water bath thermostatted at 30° C., preferably for 2 hours in a water bath thermostatted at 30° C. and ideally for 24 hours in a water bath thermostatted at 30° C. (adaptation of CIPAC test MT180).

A formulation of the present invention has a flash point greater than 60° C.

Advantageously formulations according to the invention having a flash point greater than 60° C. make it possible to address at least some of the issues discussed previously (i.e. in particular combining effective amounts of a plant nutrient, of a fatty acid ($C_1$-$C_3$) alkyl ester, and of a betaine surfactant, while maintaining satisfactory properties and while imparting improved uptake and/or biological efficacy of a pesticide in the final pesticide formulation) while at the same time reducing the amount of inconveniences in terms of safety, transport, storage and manipulation by the manufacturer and end user.

Some details or advantages of the invention will appear in the non-limitative examples below.

EXAMPLES

The following ingredients are used:
($C_{12}$-$C_{14}$)alkyldimethyl betaine, provided in the form of an aqueous composition comprising water and an 30 wt % of alkyldimethylbetaine, in which the alkyl group is a mixture of approximately 70% by weight of lauryl ($C_{12}$) and 30% by weight of tetradecyl ($C_{14}$) (provided by Solvay)

Mixture of fatty acid methyl ester (Amesolv CME, provided by Ametech)

Ammonium sulfate (provided by Quaron)

But-2-ol (provided by VWR Prolabo Chemicals)

Urea (provided by Brenntag)

Ammonium nitrate (provided by VWR Prolabo Chemicals)

Micronutrient fertilizers (provided by Azelis Chemicals, under the name Pioner Mikro Plus), added if necessary in a concentrated form (e.g. dried in 54° C. stove until e.g. up to 75 wt % of the initial weight is lost)

Sodium carbonate (provided by VWR Prolabo Chemicals)

Potassium chloride (provided by K+S Kali GmbH)

Ammonium salt of glyphosate (provided by Jiangsu Good Harvest-Weien Agrochemical Co. Ltd)

Sodium bicarbonate (provided by Solvay)

The adjuvant compositions of Examples 1 to 21 and of Comparative Examples C1 to C18 (C stands for comparative) were aqueous solutions made by adding ingredients ammonium sulfate, ($C_{12}$-$C_{14}$) alkyldimethyl betaine, but-2-ol and mixture of fatty acid methyl ester (in that order) in the relative amount set forth below in Tables I to III to water and mixing.

The adjuvant compositions of Examples 22-25 were aqueous solutions made by adding ingredients ammonium sulfate, ($C_{12}$-$C_{14}$) alkyldimethyl betaine, but-2-ol and mixture of fatty acid methyl ester (in that order) in the relative amount set forth below in Table IV to water and mixing, and adding thereto urea and mixing.

The field ready pesticide composition of Examples 26-27 were aqueous solutions made by adding ingredients ammonium sulfate, ($C_{12}$-$C_{14}$) alkyldimethyl betaine, but-2-ol and mixture of fatty acid methyl ester (in that order) in the relative amount set forth below in Table V to water and mixing, and adding thereto glyphosate ammonium and mixing.

The adjuvant compositions of Examples 28-29 were aqueous solutions made by adding ingredients urea, ($C_{12}$-$C_{14}$) alkyldimethyl betaine, but-2-ol and mixture of fatty acid methyl ester (in that order) in the relative amount set forth below in Table VI to water and mixing.

The adjuvant compositions of Examples 30-31 were aqueous solutions made by adding ingredients ammonium nitrate, ($C_{12}$-$C_{14}$) alkyldimethyl betaine, but-2-ol and mixture of fatty acid methyl ester (in that order) in the relative amount set forth below in Table VI to water and mixing.

The adjuvant compositions of Examples 32-33 were aqueous solutions made by adding ingredients ammonium sulfate (ex. 33 only), ($C_{12}$-$C_{14}$) alkyldimethyl betaine, but-2-ol and mixture of fatty acid methyl ester (in that order) in the relative amount set forth below in Table VI to water and to the the micronutrient fertilizers, and mixing.

The adjuvant compositions of Examples 34-35 were aqueous solutions made by adding ingredients sodium carbonate, ($C_{12}$-$C_{14}$) alkyldimethyl betaine, but-2-ol and mixture of fatty acid methyl ester (in that order) in the relative amount set forth below in Table VI to water and mixing.

The adjuvant compositions of Examples 36-37 were aqueous solutions made by adding ingredients potassium chloride, ($C_{12}$-$C_{14}$) alkyldimethyl betaine, but-2-ol and mixture of fatty acid methyl ester (in that order) in the relative amount set forth below in Table VI to water and mixing.

The field ready pesticide composition of Example 38 was an aqueous solution made by adding ingredients ammonium sulfate, ($C_{12}$-$C_{14}$) alkyldimethyl betaine, but-2-ol and mixture of fatty acid methyl ester (in that order) in the relative amount set forth below in Table VII to water and mixing, and adding thereto sodium bicarbonate and mixing.

In Tables I to VII the relative amounts (weight percent (=pbw), based on the total weight of the adjuvant composition) in each material is given on the basis of the named material.

In the case of ($C_{12}$-$C_{14}$)alkyldimethyl betaine (which is provided in the form of an aqueous composition comprising about 30 wt % ($C_{12}$-$C_{14}$)alkyldimethyl betaines), the relative amount is therefore the amount in ($C_{12}$-$C_{14}$)alkyldimethyl betaine per se.

For the avoidance of any doubt, this amount is different from the dry matter amount (solid content) as this aqueous composition comprising about 30 wt % ($C_{12}$-$C_{14}$)alkyldimethyl betaines also includes salts, which are not to be taken into account.

In the case of the micronutrient fertilizers (which is provided in the form of an aqueous composition comprising about 3 wt % of micronutriments (namely 0.32 wt % B, 0.13 wt % Cu, 1.62 wt % Fe, 0.63 wt % Mn, 0.06 wt % Mo and 0.32 wt % Zn)), the relative amount is the total amount in micronutriments per se. For the sake of simplicity, the relative amounts of the other constituents (minors) included in said composition (such as chelators) is not detailed in Table VI below.

Tests and Results

The storage stability of the adjuvant compositions was evaluated visually (the required outcome being the observation of a clear, homogeneous liquid exhibiting no (or only slight) phase separation).

Compositions exhibiting significant phase separation and/or solid sedimentation at time zero and room temperature were considered as not suitable and the evaluation of their physical stability stopped.

Compositions of Examples 1 to 38 all exhibited a Brookfield viscosity at 25° C. below 150 cP (measured using a Brookfield RTV viscometer, spindle 4 at 20 rpm and 100 rpm) and were all considered as pourable.

Compositions of Examples 1 to 38 also exhibited good dilution stability and provided a suitable dispersion (good dispersion after 2 inversions). Dispersion stability was assessed with CIPAC standard waters A and D and tap water (test adapted from MT 180).

Compositions of Examples 1 to 38 all exhibited a flash point greater than 60° C.

The following Tables summarise the results of the trials.

TABLE I

Adjuvant compositions containing 10 pbw of ammonium sulfate

| | Example # | | | | | | | | | | | | |
|---|---|---|---|---|---|---|---|---|---|---|---|---|---|
| | 1 | 2 | 3 | 4 | 5 | 6 | 7 | C1 | C2 | C3 | C4 | C5 | C6 |
| Ammonium sulfate (wt %) | 10.00 | 10.00 | 10.00 | 10.00 | 10.00 | 10.00 | 10.00 | 10.00 | 10.00 | 10.00 | 10.00 | 10.00 | 10.00 |
| Fatty acid methyl ester (wt %) | 9.00 | 9.00 | 9.00 | 4.50 | 11.25 | 4.50 | 9.00 | 36.00 | 27.00 | 27.00 | 36.00 | 18.00 | 54.00 |
| Betaine surfactant (wt %) | 20.49 | 15.37 | 17.93 | 12.81 | 19.21 | 15.34 | 23.06 | 5.12 | 17.93 | 15.37 | 10.25 | 5.12 | 5.12 |
| But-2-ol (wt %) | 3.69 | 2.77 | 3.23 | 2.31 | 3.46 | 2.77 | 4.15 | 0.92 | 3.23 | 2.77 | 1.85 | 0.92 | 0.92 |
| Water (wt %) | q.s. 100% | q.s. 100% | q.s. 100% | q.s. 100% | q.s. 100% | q.s. 100% | q.s. 100% | q.s. 100% | q.s. 100% | q.s. 100% | q.s. 100% | q.s. 100% | q.s. 100% |
| betaine surfactant: fatty acid methyl ester wt ratio | 2.3 | 1.7 | 2.0 | 2.8 | 1.7 | 3.4 | 2.6 | 0.1 | 0.7 | 0.6 | 0.3 | 0.3 | 0.1 |
| physical stability | | | | | | | | | | | | | |
| time zero at room temperature | clear, homogeneous, pourable liquid | | | | | | | significant phase separation | | | | | |
| 2 weeks at room T° C. | stable | stable | stable | stable | stable | stable | stable | DID NOT CONTINUE ANY FURTHER TESTING AS EMULSION CHARACTERISTICS FAILED | | | | | |
| 1 week at −5° C. | stable | stable | stable | stable | stable | stable | stable | | | | | | |
| 1 week at 0° C. | stable | stable | stable | stable | stable | stable | stable | | | | | | |
| 1 month at 45° C. | stable | stable | stable | stable | stable | stable | stable | | | | | | |
| 2 weeks at 54° C. | stable | stable | stable | stable | stable | stable | stable | | | | | | |

TABLE II

Adjuvant compositions containing 15 pbw of ammonium sulfate

| | Example # | | | | | | | | | | | | |
|---|---|---|---|---|---|---|---|---|---|---|---|---|---|
| | 8 | 9 | 10 | 11 | 12 | 13 | 14 | C7 | C8 | C9 | C10 | C11 | C12 |
| Ammonium sulfate (wt %) | 15.00 | 15.00 | 15.00 | 15.00 | 15.00 | 15.00 | 15.00 | 15.00 | 15.00 | 15.00 | 15.00 | 15.00 | 15.00 |
| Fatty acid methyl ester (wt %) | 8.50 | 8.50 | 8.50 | 12.75 | 4.25 | 10.63 | 4.25 | 51.00 | 34.00 | 25.50 | 25.50 | 34.00 | 17.00 |
| Betaine surfactant (wt %) | 19.35 | 14.51 | 16.94 | 16.94 | 12.10 | 18.14 | 14.51 | 9.68 | 4.84 | 16.94 | 14.51 | 9.68 | 4.84 |

TABLE II-continued

Adjuvant compositions containing 15 pbw of ammonium sulfate

| | Example # | | | | | | | | | | | | |
|---|---|---|---|---|---|---|---|---|---|---|---|---|---|
| | 8 | 9 | 10 | 11 | 12 | 13 | 14 | C7 | C8 | C9 | C10 | C11 | C12 |
| But-2-ol (wt %) | 3.49 | 2.62 | 3.05 | 3.05 | 2.18 | 3.27 | 2.62 | 1.74 | 0.87 | 3.05 | 2.62 | 1.74 | 0.87 |
| Water (wt %) | q.s. 100% | q.s. 100% | q.s. 100% | q.s. 100% | q.s. 100% | q.s. 100% | q.s. 100% | q.s. 100% | q.s. 100% | q.s. 100% | q.s. 100% | q.s. 100% | q.s. 100% |
| betaine surfactant: fatty acid methyl ester wt ratio physical stability | 2.3 | 1.7 | 2.0 | 1.3 | 2.8 | 1.7 | 3.4 | 0.2 | 0.1 | 0.7 | 0.6 | 0.3 | 0.3 |
| time zero at room temperature | clear, homogeneous, pourable liquid | | | | | | | significant phase separation + solid sedimentation | | | | Significant phase separation | |
| 2 weeks at room T° C. | stable | stable | stable | stable | stable | stable | stable | DID NOT CONTINUE ANY FURTHER TESTING AS EMULSION CHARACTERISTICS FAILED | | | | | |
| 1 week at −5° C. | stable | stable | stable | stable | stable | stable | Stable | | | | | | |
| 1 week at 0° C. | stable | stable | stable | stable | stable | stable | Stable | | | | | | |
| 1 month at 45° C. | stable | stable | stable | slight phase separation | stable | stable | Stable | | | | | | |
| 2 weeks at 54° C. | stable | stable | stable | slight phase separation | stable | stable | Stable | | | | | | |

TABLE III

Adjuvant compositions containing 19 pbw of ammonium sulfate

| | Example # | | | | | | | | | | | | |
|---|---|---|---|---|---|---|---|---|---|---|---|---|---|
| | 15 | 16 | 17 | 18 | 19 | 20 | 21 | C13 | C14 | C15 | C16 | C17 | C18 |
| Ammonium sulfate (wt %) | 19.00 | 19.00 | 19.00 | 19.00 | 19.00 | 19.00 | 19.00 | 19.00 | 19.00 | 19.00 | 19.00 | 19.00 | 19.00 |
| Fatty acid methyl ester (wt %) | 8.10 | 8.10 | 8.10 | 12.15 | 4.05 | 11.0 | 4.05 | 48.60 | 24.30 | 24.30 | 32.40 | 16.20 | 48.60 |
| Betaine surfactant (wt %) | 18.44 | 13.83 | 16.14 | 16.14 | 11.53 | 15.24 | 13.83 | 9.22 | 16.14 | 13.84 | 9.22 | 4.61 | 4.61 |
| But-2-ol (wt %) | 3.32 | 2.49 | 2.91 | 2.91 | 2.08 | 2.67 | 2.49 | 1.66 | 2.91 | 2.49 | 1.66 | 0.83 | 0.83 |
| Water (wt %) | q.s. 100% | q.s. 100% | q.s 100% | q.s. 100% | q.s. 100% | q.s. 100% | q.s. 100% | q.s. 100% | q.s. 100% | q.s. 100% | q.s. 100% | q.s. 100% | q.s. 100% |
| betaine surfactant: fatty acid methyl ester wt ratio physical stability | 2.3 | 1.7 | 2.0 | 1.3 | 2.8 | 1.4 | 3.4 | 0.2 | 0.7 | 0.6 | 0.3 | 0.3 | 0.1 |
| time zero at room temperature | clear, homogeneous, pourable liquid | | | | | | | significant phase separation + solid sedimentation | significant phase separation + solid sedimentation | significant phase separation | significant phase separation | significant phase separation + solid sedimentation | significant phase separation |
| 2 weeks at room T° C. | stable | stable | stable | stable | stable | stable | stable | DID NOT CONTINUE ANY FURTHER TESTING AS EMULSION CHARACTERISTICS FAILED | | | | | |
| 1 week at −5° C. | stable | stable | stable | stable | stable | Stable | stable | | | | | | |
| 1 week at 0° C. | stable | stable | stable | stable | stable | Stable | stable | | | | | | |
| 1 month at 45° C. | stable | stable | stable | slight phase separation | stable | Stable | stable | | | | | | |
| 2 weeks at 54° C. | stable | stable | stable | slight phase separation | Stable | Stable | stable | | | | | | |

TABLE IV

Adjuvant compositions further containing urea

| | Example # | | | |
|---|---|---|---|---|
| | 22 | 23 | 24 | 25 |
| Ammonium sulfate (wt %) | 18.64 | 18.24 | 22.45 | 21.73 |
| Fatty acid methyl ester (wt %) | 10.80 | 10.56 | 9.51 | 9.10 |
| Betaine surfactant (wt %) | 14.93 | 14.63 | 13.18 | 12.60 |
| But-2-ol (wt %) | 2.60 | 2.56 | 2.29 | 2.22 |
| Urea (wt %) | 2.00 | 4.00 | 7.52 | 11.28 |
| Water (wt %) | q.s. 100% | q.s. 100% | q.s. 100% | q.s. 100% |
| betaine surfactant:fatty acid methyl ester wt ratio | 1.4 | 1.4 | 1.4 | 1.4 |
| physical stability | | | | |
| time zero at room temperature | clear, homogeneous, pourable liquid | | | |
| 2 weeks at room T° C. | stable | stable | stable | stable |
| 1 week at −5° C. | Stable | Stable | slight phase separation | slight phase separation |
| 1 week at 0° C. | Stable | Stable | slight phase separation | slight phase separation |
| 1 month at 45° C. | Stable | Stable | slight phase separation | slight phase separation |
| 2 weeks at 54° C. | Stable | Stable | slight phase separation | slight phase separation |

TABLE V

Field ready pesticide (glyphosate) formulations

| | Example # | |
|---|---|---|
| | 26 | 27 |
| Ammonium sulfate (wt %) | 16.43 | 18.06 |
| Fatty acid methyl ester (wt %) | 11.09 | 10.46 |
| Betaine surfactant (wt %) | 15.33 | 14.48 |
| But-2-ol (wt %) | 2.67 | 2.54 |
| Ammonium glyphosate (wt %) | 2.05 | 4.95 |
| Water (wt %) | q.s. 100% | q.s. 100% |
| betaine surfactant:fatty acid methyl ester wt ratio | 1.4 | 1.4 |
| physical stability | | |
| time zero at room temperature | clear, homogeneous, pourable liquid | |
| 2 weeks at room T° C. | stable | stable |
| 1 week at −5° C. | Stable | Stable |
| 1 week at 0° C. | Stable | Stable |
| 1 month at 45° C. | slight phase separation | slight phase separation |
| 2 weeks at 54° C. | slight phase separation | slight phase separation |

TABLE VI

Adjuvant compositions containing various plant nutrients

| | Example # | | | | | | | | | |
|---|---|---|---|---|---|---|---|---|---|---|
| | 28 | 29 | 30 | 31 | 32 | 33 | 34 | 35 | 36 | 37 |
| Fatty acid methyl ester (wt %) | 7.24 | 5.02 | 5.06 | 8.75 | 8.25 | 11.00 | 12.55 | 12.31 | 11.00 | 6.97 |
| Betaine surfactant (wt %) | 19.93 | 15.31 | 15.42 | 16.88 | 20.95 | 15.24 | 17.38 | 17.06 | 17.94 | 23.94 |
| But-2-ol (wt %) | 7.89 | 8.24 | 7.56 | 6.68 | 2.00 | 2.67 | 3.05 | 2.99 | 2.67 | 2.79 |
| Ammonium sulfate (wt %) | — | — | — | — | — | 19.00 | — | — | — | — |
| Urea (wt %) | 18.42 | 19.09 | — | — | — | — | — | — | — | — |
| Ammonium nitrate (wt %) | — | — | 19.23 | 12.81 | — | — | — | — | — | — |
| micronutriments (wt %) | — | — | — | — | 0.9 | 0.5 | — | — | — | — |
| Sodium carbonate | — | — | — | — | — | — | 7.60 | 9.33 | — | — |
| Potassium chloride | — | — | — | — | — | — | — | — | 10.00 | 10.45 |
| Water (wt %) (* = + minors from the micronutrient fertilizers composition) | q.s. 100% | q.s. 100% | q.s. 100% | q.s. 100% | q.s. 100% * | q.s. 100% * | q.s. 100% | q.s. 100% | q.s. 100% | q.s. 100% |
| betaine surfactant:fatty acid methyl ester wt ratio | 2.8 | 3.0 | 3.0 | 1.9 | 2.5 | 1.4 | 1.4 | 1.4 | 1.6 | 3.4 |
| physical stability | | | | | | | | | | |
| time zero at room temperature | clear, homogeneous, pourable liquid | | | | | | | | | |
| 2 weeks at room T° C. | stable | stable | stable | stable | stable | stable | stable | stable | stable | stable |
| 1 week at −5° C. | stable | stable | stable | stable | stable | stable | stable | stable | stable | stable |
| 1 week at 0° C. | stable | stable | stable | stable | stable | stable | stable | stable | stable | stable |
| 1 month at 45° C. | stable | stable | stable | stable | stable | stable | stable | stable | stable | stable |
| 2 weeks at 54° C. | slight phase separation | stable | stable | slight phase separation | stable | stable | slight phase separation | slight phase separation | stable | slight phase separation |

TABLE VII

Field ready pesticide (sodium bicarbonate) composition

| | Example # 38 |
|---|---|
| Ammonium sulfate (wt %) | 18.24 |
| Fatty acid methyl ester (wt %) | 10.56 |
| Betaine surfactant (wt %) | 14.63 |
| But-2-ol (wt %) | 2.56 |
| Sodium bicarbonate (wt %) | 4 |
| Water (wt %) | q.s. 100% |
| betaine surfactant:fatty acid methyl ester wt ratio | 1.4 |
| physical stability | |
| time zero at room temperature | clear, homogeneous, pourable liquid |
| 2 weeks at room T° C. | stable |
| 1 week at −5° C. | stable |
| 1 week at 0° C. | stable |
| 1 month at 45° C. | stable |
| 2 weeks at 54° C. | slight phase separation |

Bio-Activity (Assessed in Field Trials)

Activity tests are performed for an adjuvant composition of the invention (Example #20) and for the following comparative compositions:

Comparative composition I (control): no adjuvant formulation

Comparative adjuvant composition II: adjuvant=mixture of 0.5 L of Actirob B (oil concentrate (main ingredient: rapeseed oil methyl ester) provided by BayerCropScience) and 0.75 L of Actimum (ammonium sulfate, 460 g/L, provided by Monsanto)

Comparative adjuvant composition III: adjuvant=mixture of 1 L of Actirob B (oil concentrate (main ingredient: rapeseed oil methyl ester) provided by BayerCropScience) and 1.5 L of Actimum (ammonium sulfate, 460 g/L, provided by Monsanto)

The adjuvant formulation of the invention (Example #20) and Comparative adjuvant compositions II and III are tank-mixed with a pesticide (Atlantis WG 400 g in bio-activity test A and Quasar 250 g in bio-activity test B) and their activity is compared when applied (by spraying) in a field of winter wheat crop (target weed being Ray-Grass in bio-activity test A and Bromgrass in bio-activity test B).

The tank mix efficacy was evaluated visually by an expert farmer, based on the following evaluations:

i/ Selectivity (ranging from 0 (best selectivity) to 10 (worst selectivity), target being to have a score at least below 3). Selectivity means selectivity of the pesticide vs weed (compared to crop). It is assessed visually using untreated crop as a reference.

ii/ Efficacy (ranging from 0 (worst efficacy) to 100 (best efficacy), target being to have a score of at least 70).

Tank mix formulations are applied using XR 110002-VS nozzles, sprayed at a water volume of 150 L/ha with a pressure of 200 kPa.

Results are the following:

TABLE VIII

Field trials (bio-activity test A)

| Pesticide | Adjuvant formulation | Selectivity (0-10) | Efficacy (0-100) |
|---|---|---|---|
| Atlantis WG 400 g | Comparative composition I (control) | 1.7 | 15 |
| Atlantis WG 400 g | Adjuvant composition of Example #20 (1.5 L) | 2.0 | 70 |
| Atlantis WG 400 g | Comparative adjuvant composition II | 2.0 | 47 |
| Atlantis WG 400 g | Comparative adjuvant composition III | 3.0 | 60 |

TABLE IX

Field trials (bio-activity test B)

| Pesticide | Adjuvant formulation | Selectivity (0-10) | Efficacy (0-100) |
|---|---|---|---|
| Quasar 250 g | Comparative composition I (control) | 1.0 | 80 |
| Quasar 250 g | Adjuvant composition of Example #20 (1.5 L) | 1.0 | 100 |
| Quasar 250 g | Comparative adjuvant composition II | 2.0 | 90 |
| Quasar 250 g | Comparative adjuvant composition III | 2.0 | 100 |

Composition of Example #20 is more efficient than Comparative adjuvant compositions II and III. It is also easier to use as it combines several adjuvant compounds in a single formulation (whereas Comparative adjuvant compositions II and III had to be prepared at the point of use by mixing two separate adjuvant compositions).

The invention claimed is:

1. An aqueous formulation comprising: a) at least one plant nutrient selected from the group consisting of ammonium sulfate, urea, ammonium nitrate, micronutrient fertilizers, and mixtures thereof; and surfactants, wherein the surfactants consist of: b) at least one fatty acid ($C_1$-$C_3$) alkyl ester according to structure (I):

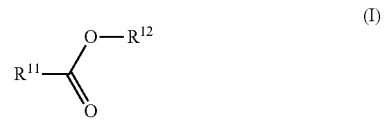

(I)

wherein $R^{11}$ is (C6-C24)alkyl or (C6-C24)alkenyl, and $R^{12}$ is (C1-C3)alkyl, c) at least one betaine surfactant according to structure (II);

(II)

wherein:

$R^{21}$ and $R^{22}$ are each independently $(C_1-C_6)$alkyl, $R^{23}$ is $(C_6-C_{30})$alkyl, and $R^{24}$ is methylene, and d) optionally, at least one co-surfactant different from the betaine surfactant selected from the group consisting of propan-1-ol, propan-2-ol, butan-1-ol, butan-2-ol, pentan-1-ol, pentan-2-ol, and pentan-3-ol, wherein:

the betaine surfactant is present in an amount of at least 5 pbw, based on 100 pbw of the formulation, the weight ratio between the betaine surfactant and the fatty acid $(C_1-C_3)$alkyl ester is greater than 0.9:1 and less than or equal to 3.4:1, and the aqueous formulation is clear and homogeneous.

2. The formulation of claim 1, comprising, based on 100 pbw of the formulation, from about 4 pbw to about 35 pwb of the one or more plant nutrient.

3. The formulation of claim 1, wherein the weight ratio between the betaine surfactant and all the surfactants different from the betaine surfactant is greater than 1:1.

4. An agricultural adjuvant composition, comprising the formulation of claim 1, wherein the only surfactants are the: b) at least one fatty acid $(C_1-C_3)$ alkyl ester according to structure (I):

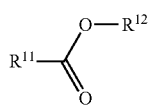

wherein $R^{11}$ is (C6-C24)alkyl or (C6-C24)alkenyl, and $R^{12}$ is (C1-C3)alkyl, c) at least one betaine surfactant according to structure (II):

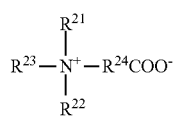

wherein:

$R^{21}$ and $R^{22}$ are independently $(C_1-C_6)$alkyl, $R^{23}$ is $(C_6-C_{30})$alkyl, and $R^{24}$ is methylene, and d) optionally, at least one co-surfactant different from the betaine surfactant selected from the group consisting of propan-1-ol, propan-2-ol, butan-1-ol, butan-2-ol, pentan-1-ol, pentan-2-ol, and pentan-3-ol, from the formulation of claim 1.

5. A low concentrated pesticide composition comprising at least the formulation of claim 1, and a pesticide compound in an amount ranging from 0.05 to 14 pbw, based on 100 pbw of the low concentrated pesticide composition, wherein the only surfactants are the: b) at least one fatty acid $(C_1-C_3)$ alkyl ester according to structure (I):

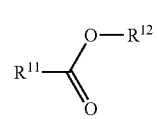

wherein $R^{11}$ is (C6-C24)alkyl or (C6-C24)alkenyl, and $R^{12}$ is (C1-C3)alkyl, c) at least one betaine surfactant according to structure (II):

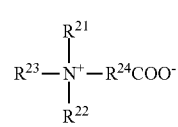

wherein:

$R^{21}$ and $R^{22}$ are each independently $(C_1-C_6)$alkyl, $R^{23}$ is $(C_6-C_{30})$alkyl, and $R^{24}$ is methylene and d) optionally, at least one co-surfactant different from the betaine surfactant selected from the group consisting of propan-1-ol, propan-2-ol, butan-1-ol, butan-2-ol, pentan-1-ol, pentan-2-ol, and pentan-3-ol, from the formulation of claim 1.

6. The low concentrated pesticide composition of claim 5, wherein the pesticide is an herbicide.

7. A method for preparing a tank mix, which comprises the step of contacting a pesticide formulation, water, and a tank mix adjuvant, wherein the tank mix adjuvant is the formulation of claim 1, and wherein the only surfactants are the: b) at least one fatty acid $(C_1-C_3)$ alkyl ester according to structure (I):

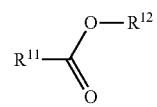

wherein $R^{11}$ is (C6-C24)alkyl or (C6-C24)alkenyl, and $R^{12}$ is (C1-C3)alkyl, c) at least one betaine surfactant according to structure (II):

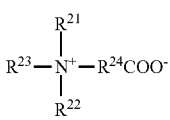

wherein:

$R^{21}$ and $R^{22}$ are independently $(C_1-C_6)$alkyl, $R^{23}$ is $(C_6-C_{30})$alkyl, and $R^{24}$ is methylene, and d) optionally, at least one co-surfactant different from the betaine surfactant selected from the group consisting of propan-1-ol, propan-2-ol, butan-1-ol, butan-2-ol, pentan-1-ol, pentan-2-ol, and pentan-3-ol, from the formulation of claim 1.

8. The formulation of claim 3, wherein the weight ratio between the betaine surfactant and all the surfactants different from the betaine surfactant is greater than 2:1.

9. The agricultural adjuvant composition of claim 4, wherein the composition is a tank-mix adjuvant.

10. The agricultural adjuvant composition of claim 4, wherein the composition is an adjuvant for a low concentrated pesticide composition.

11. The low concentrated pesticide composition of claim 6, wherein the herbicide is selected from glyphosate, glufosinate, their respective water soluble salts and esters, and mixtures thereof.

12. The low concentrated pesticide composition of claim 5, wherein the pesticide compound is in an amount ranging from 0.05 to 12 ppb, based on 100 ppw of the low concentrated pesticide composition.

13. The low concentrated pesticide composition of claim 5, wherein the pesticide compound is in an amount ranging from 0.05 to 10 ppb, based on 100 ppw of the low concentrated pesticide composition.

14. The low concentrated pesticide composition of claim 5, wherein the weight ratio between the betaine surfactant and the fatty acid (C1-C3) alkyl ester is 1.1:1 to 3.4:1.

15. The low concentrated pesticide composition of claim 5, wherein the plant nutrient is in an amount of from about 10 pbw to about 25 pbw, based on 100 pbw of the formulation.

16. The low concentrated pesticide composition of claim 5, wherein the co-surfactant is present in an amount of from about 0.5 ppw to about 20 ppw, based on 100 pbw of the formulation.

* * * * *